May 9, 1961
R. B. CREAN
2,983,656
ELECTROLYTIC METHOD OF PURIFYING AMINE SOLUTIONS
Filed Feb. 10, 1959
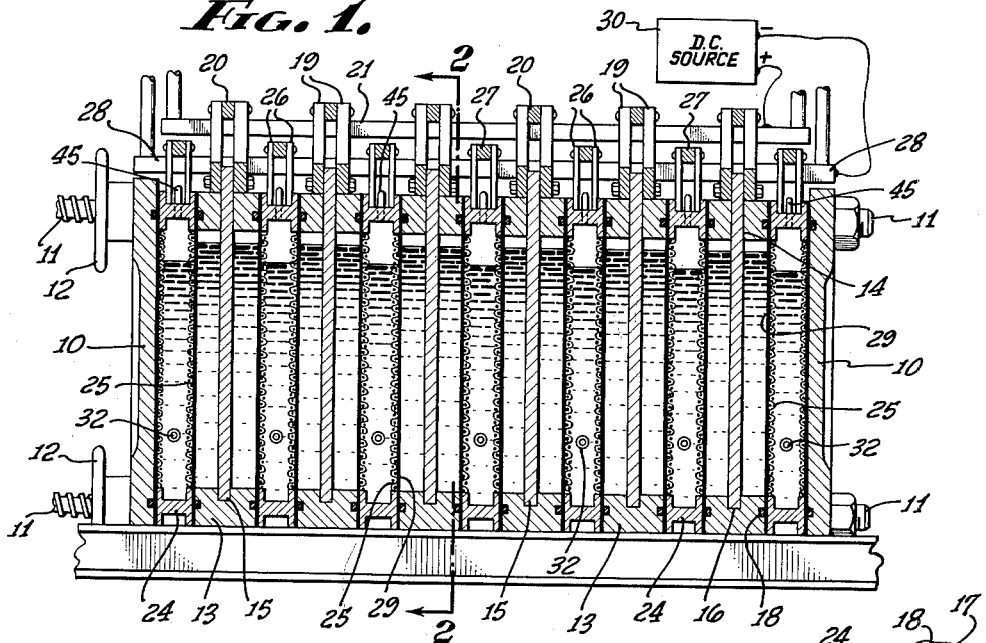
FIG. 1.
FIG. 3.
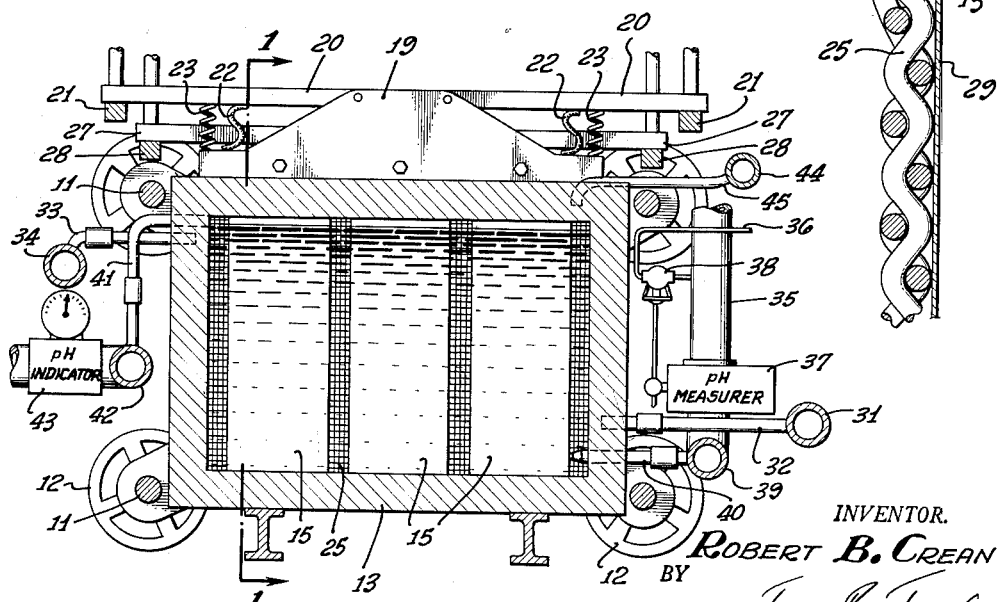
FIG. 2.
INVENTOR.
ROBERT B. CREAN
BY
AGENT.

United States Patent Office 2,983,656
Patented May 9, 1961

2,983,656
ELECTROLYTIC METHOD OF PURIFYING AMINE SOLUTIONS

Robert B. Crean, Los Angeles County, Calif., assignor to Socony Mobil Oil Company, Inc., New York, N.Y., a corporation of New York Filed Feb. 10, 1959, Ser. No. 792,333
8 Claims. (Cl. 204—131)

This invention relates to electrolytic purification of amine solutions, particularly those employed for absorption of acid-reacting gaseous substances from gases and from hydrocarbon liquids.

The amine absorption process as disclosed by R. R. Bottoms in U.S. Reissue Patent 18,958 consists essentially of bringing an impure gas into contact with an aqueous amine solution which dissolves acidic substances such as $H_2S$ and $CO_2$, passing the fouled amine solution to a vessel wherein it is freed of the acid-reacting gases by steam stripping, and using the reactivated solution for treating further quantities of the impure gas. The amine is usually one of the ethanolamines or isopropanoldiamine. This process has been used extensively, but in some cases it is uneconomic because of accumulation in the amine solution of anions such as thiocyanate and thiosulfate, which combine with the amines to form salts which are not decomposed in the stripping column.

Abraham Shapiro, in U.S. Patent 2,768,945, disclosed passing a portion of the amine solution, subsequently to the steam stripping step, through electrolytic cells of the diaphragm type for removal of enough of the strong and/or nonvolatile anions to prevent their accumulation in the system. The diaphragms recommended by Shapiro were made of permeable ceramic material. Such diaphragms, however, are not readily cleaned if they become clogged with precipitated substances, and to discard and replace used ceramic plates puts a heavy economic burden on the process. Consequently many efforts were made to find a diaphragm material which could remain in service for a long period of time, which could be economically discarded and replaced, or both.

The asbestos materials employed in various other processes of electrolysis through diaphragms are too porous to be relied upon for adequately blocking passage of dissolved substances by diffusion. They function well in methods of producing hydrogen and oxygen by electrolysis of water, in which they are required to do no more than to block passage of bubbles of the evolved gases, and they are also satisfactory in methods of producing chlorine and caustic soda by electrolysis of sodium-chloride solutions, in which diffusion of sodium hydroxide into the anode compartments is prevented by maintaining a flow of liquid through the diaphragms into the cathode compartments while the diaphragms block passage of bubbles of chlorine. But in the electrolytic purification of amine solutions contaminated with thiocyanate and the like, both the cathode products and the anode products are principally dissolved substances rather than gases; therefore diffusion of solutes through the diaphragms in either direction gravely impairs the efficiency of the process. Asbestos and other inorganic fibrous substances can be formed into relatively dense sheets or plates, but these share the disadvantages of the ceramic plates. Furthermore, asbestos is not fully resistant to the mixture of thiocyanic acid and its oxidation products which is produced in the anode compartments.

In assessing the ability of a diaphragm material to minimize diffusion, the most important single consideration is the "pore diameter," that is, the diameter of the largest particles capable of passing through a material. In a diaphragm employed in the electrolysis of amine solutions, the pore diameter is preferably not greater than about 10 microns, although, by using relatively thick diaphragms and conducting the process carefully, useful results can be obtained with diaphragms having pore diameters as large as 100 microns. The lower limit for the pore diameter is of the order of molecular dimensions; materials with pore diameter as small as 30 A. have been found to be satisfactory. To achieve good permeability to ions, it is preferable that the diaphragm material be thin and that it have a high proportion of pore space per unit area; mechanical strength and availability of materials are the factors limiting the latter properties.

In the search for improved diaphragm materials for use in the Shapiro process, numerous organic polymeric substances were tested. These included natural and regenerated celluose, animal membranes, and a wide variety of synthetics. None which was obtainable in the form of sheets with the proper degree of permeability and pore diameter was found to be capable of withstanding attack in the electrolytic cells for a sufficient period of time to be commercially useful.

I have discovered that diaphragms made of cellulose are not attacked in the electrochemical environment to which they are subjected if the liquid in the anode compartments of the cells is kept neutral or alkaline by the addition of a base to neutralize the acid electrolysis products. Preferably the pH of the anolyte is maintain within the range 7.5 to 8.0. The pH can be as high as 10.0 without impairing operation of the electrolytic cells, but to maintain a pH higher than about 8.0 gives no further benefits in return for the increased consumption of the base. Expenditure of the base can be reduced by permitting the pH to fall as low as 6.0; at that level the cellulose diaphragms are attacked but they endure for sufficient periods of time for the process to be practical in at least some circumstances.

I prefer to use ammonia as the base which is added to the anolyte. Other bases are equally capable of neutralizing the acid electrolysis products and they may be employed, but they have various faults. If the hydroxides or alkaline salts of sodium or potassium are used, the metallic cations pass into the amine solution and remain there. This is not necessarily undesirable; in older forms of the amine absorption process sodium carbonate was often added to the amine solution to provide a reserve of alkalinity. However, use of an alkali metal should not be continued until it accumulates in the amine solution to an amount greater than that required to combine with the thiocyanate and other strong anions maintained in the solution; an excess of alkali metal would carry sulfide, carbonate, etc. through the steam stripping column and thereby put an unnecessary load on the electrolytic purification step.

Lime, added to the anolyte as a slurry of calcium hydroxide, has been found to function well as the neutralizing agent and it does not accumulate in the amine solution because of the low solubility of $Ca(OH)_2$, but precipitated calcium compounds may be troublesome in the system unless provision for their removal is included. Introduction into the anolyte of the same amine as that which is purified is satisfactory with respect to protection of the diaphragms and absence of undesirable cations, but it leads to some loss of amine as a result of oxidation reactions in the anode compartments.

When ammonia is used, the ammonium ion passes into the amine solution, but it does not remain there because of the tendency of ammonia to be driven out of solution by heat. When the electrolytic purification is included as a step in a cyclic amine absorption process, as taught in the above-mentioned Shapiro patent, nearly all the ammonia is removed from the amine solution in the steam stripping column. When contaminated amine solution is removed from the cyclic absorption system and purified by recirculation through an electrolytic battery in a separate operation, its ammonia content may build up to about 1.5% and remain there.

Preferably the diaphragms are thin sheets of cellulosic material consisting at least in part of regenerated cellulose, such as cellulose regenerated from viscose. Unwaterproofed cellophone is good; some composite materials consisting of both natural and regenerated cellulose, such as the sausage-casing material described in U.S. Patent 2,105,273 and a similar product which is reinforced with fibers of flax, are even better because of improved resistance to tearing.

Other forms of cellulose are equivalent as regards resistance to the electrochemical environment but they are less desirable because of structural or economic considerations. Maple veneer .050 inch thick was found to function satisfactorily, but it requires mechanical restraint to overcome its tendency to warp; this complicates the design of the cells. Woven fabrics cannot be used unless the large interstices between threads are filled with a water-resistant material. Felted cellulosic fabric may be used but their availability is limited.

A convenient method of supporting diaphragms made of pliable materials such as cellulose film is to make the cathode of screen and to place the diaphragm directly against the cathode, where it can be held by hydrostatic pressure. In the above-mentioned Shapiro patent it was recommended that care be used to keep the liquid levels of the catholyte and anolyte close to equality, in order to minimize flow of water through the diaphragms. It was found, however, that when diaphragms having the permeability and pore diameter of cellulose film are employed, a moderate pressure differential is permissible and that a hydrostatic head of about three inches is staisfactory.

Secondary advantages of the method disclosed herein are that hydrogen cyanide is not given off by the electrolytic battery and that (except when lime or a similar base is chosen) little or no solid matter is precipitated.

Fig. 1 of the drawing is a view in longitudinal section on the line 1—1 of Fig. 2, showing an electrolytic battery for practicing the method disclosed herein;

Fig. 2 is a cross section on the line 2—2 of Fig. 1; and

Fig. 3 is a magnified detail from Fig. 1, showing fragments of a screen cathode and of a diaphragm and the manner in which they are mounted.

Referring to the drawing, the electrolytic battery is of the "filter-press" type, wherein the components are held together and seals against leakage are maintained by mechanical pressure of end plates 10—10 which are pressed toward one another by clamps consisting of threaded rolls 11—11 and wheels 12—12 having central openings with female threads to fit the rods.

A number of rectangular frames 13—13 made of a material of low conductivity (marine plywood has proved to be satisfactory) are used for the peripheries of the anode compartments. The upper sides of these frames are slotted as at 14 to receive anode plates 15—15 which may be made of graphite. The lower sides of the frames are grooved as at 16 to receive the lower ends of the anode plates and thereby to hold them in fixed position. The faces of the frames may be grooved as shown at 17 of Fig. 3 to receive the flexible packing rings 18.

The upper ends of anode plates 15—15 are bolted to pairs of copper plates 19—19 which are pivotally connected with the inner ends of bus bars 20—20, the outer ends of which rest on conductors 21—21. To insure good electrical contacts, plates 19—19 are connected with bus bars 20—20 by flexible conductor cables 22—22 and springs 23—23.

The cathode compartments are rectangular boxes which may be made of steel, preferably stainless, having solid frame members 24—24 and faces 25—25 of heavy screening, the latter being the cathodes of the electrolytic battery. The upper edges of the cathode compartments are affixed to copper plates 26—26 which are connected with bus bars 27—27 by means of pivots, conductor cables, and springs (not visible in the drawing) in the same manner that plates 19—19 are connected with bus bars 20—20. The outer ends of the bus bars 27—27 rest on conductor bars 28—28. The two screens which fit against end plates 10—10 do not function as cathodes; they are included in the structure merely for the purpose of making all the cathode compartments interchangeable.

The cathode compartments and the anode compartments are separated from one another by diaphragms 29—29 of regenerated cellulose film. Each diaphragm has its edges held between an anode-compartment frame 13 and a cathode-compartment frame 24 so that the remainder of the diaphragm rests against a screen cathode 25, as more clearly shown in Fig. 3. The relative thickness of the diaphragm as portrayed in Fig. 3 is exaggerated.

Anodes 15—15 are connected with the positive terminal of direct-current source 30 through plates 19—19, bus bars 20—20, and conductor bars 21—21. The cathodes are connected with the negative terminal of the current source through plates 26—26, bus bars 27—27, and conductor bars 28—28.

Referring to Fig. 2, impure amine solution is brought to the electrolytic battery by inlet manifold 31 which is connected with each of the cathode compartments by a tube 32. Each cathode compartment discharges solution having an increased proportion of free amine through an outlet tube 33 (located near the top of the compartment to serve as a weir for establishing the liquid level) which is connected with outlet manifold 34.

Water for the anode compartments is brought to the electrolytic battery by pipe 35 into which ammonia (either gaseous or aqueous) is injected by tube 36. After injection of the ammonia the water is passed through pH measurer 37 which is connected for automatic control of valve 38 for regulation of the quantity of ammonia injected. The ammoniated water then flows into inlet manifold 39 which is connected with each of the anode compartments by a tube 40. Each anode compartment discharges used anolyte through an outlet tube 41 which is placed at a higher level than catholyte outlet 33 for the purpose of maintaining the hydrostatic pressure differential which keeps the diaphragm in contact with the cathode and away from the anode. The anolyte outlet tubes are connected into outlet manifold 42, from which liquid flows through pH indicator 43.

The variable which requires control is the pH of the anolyte in the neighborhood of the anode compartment outlets, but, because of the difficulty in achieving good automatic control when there is a considerable time lag between the point where control is exerted and the point where the controlling measurement is taken, pH measurer 37 is placed on the inlet side of the electrolytic battery. In operation of the method, pH indicator 43 is observed from time to time and, if it shows departure from the range pH 7.5 to 8.0 or such other range as may have been chosen because of the economic circumstances of a particular time and place, an appropriate adjustment of the operative connection between pH measurer 37 and valve 38 is made so that the pH as shown by indicator 43 will be returned to within the desired range.

Gases and vapors produced in the cells are withdrawn through other outlets. Each cathode compartment communicates with gas-outlet manifold 44 through a tube 45. The anode compartments produce little or no gas; the oxygen freed at the anodes is consumed in oxidation reactions and acidic gases such as hydrogen cyanide are retained in solution in the form of salts. If any anode gases are produced, they emerge through the openings between anode plates at the tops of the cells.

The major portion of the investigation of various diaphragm materials and various degrees of pH was performed in the laboratory with a single electrolytic cell having one anode, one cathode, and a diaphragm of 40 square inches effective area. This small-scale electrolysis was not considered to give a good indication of the efficiency of the process when transferred to an industrial-scale plant, but it gave reliable indications of diaphragm usefulness and stability.

It was found that diaphragms of cellulosic material (other than paper) endure for a day or more when the pH of the anolyte is maintained at 6.0. Ordinarily better performance is required but in some cases, such as in a plant of small capacity where the labor of replacing diaphragms is a minor factor and the cost of supplying ammonia is relatively high, it may be preferable to keep the anolyte at pH 6.0. At pH 6.5 cellulosic diaphragms last for at least three or four days; this may be considered satisfactory performance whenever the cost of ammonia is high and recovery of ammonia for further use is inconvenient. When the pH is 7.5 cellulosic diaphragms endure for periods of weeks.

Different forms of cellulose were not found to differ significantly with respect to stability in the electrochemical environment. The presence of lignin was not harmful; a piece of maple veneer .050 inch thick was still intact after having been used as a diaphragm for 109 hours although it had warped sufficiently to indicate that an electrolytic battery as described above would require modification to permit the use of wood veneers. Paper was found unsatisfactory not because its cellulose is subject to attack but because ordinary forms of paper do not maintain their physical structure in the presence of water. Paper can be made water-resistant without destroying its permeability by impregnating it with a liquid derivative of cellulose such as viscose or a cuprammonium solution and then regenerating the cellulose from the derivative in the customary manner; this yields essentially the same material as the sausage casings described in the above-mentioned Patent 2,105,273.

With respect to permeability and pore diameter, it was found that regenerated cellulose film, the composite sheets including regenerated cellulose, veneers of fine-grained woods, and (for a brief period) high-wet-strength kraft paper are satisfactory. Felted cotton fabric is said to be a manufactured commodity but a supply of the material was not found in the region where these experiments were performed; however, there is no doubt that a cotton felt of small pore diameter is a useful diaphragm material.

Laboratory experiments having indicated that regenerated cellulose is the preferred diaphragm material, test runs on a pilot-plant scale were made employing films of cellulose .0045 inch thick, regenerated from viscose and reinforced with fibers of flax. The electrolytic battery employed was essentially like that portrayed in the drawing and described above. It consisted of three cathode compartments, four anode compartments, and six diaphragms each having an effective area of 185 square inches. The electrode spacing was approximately one inch. Ammonia was injected into the inflowing anolyte liquid in amounts required to keep the pH of the anolyte liquid discharged from the cells within the range 7.5 to 8.0. The amine solution subjected to electrolysis was an aqueous solution of diethanolamine heavily contaminated with thiocyanate and including other undesirable anions such as formate and acetate. Two samples of the solution, of about 1000 gallons each, were treated by repeated circulation through the cathode compartments of the electrolytic battery. Test Run A was started with new diaphragms; after its termination the same diaphragms were left in service for Test Run B. Conditions and results were as follows:

| Operating Data | | Run A | Run B |
|---|---|---|---|
| Applied E.M.F. | volts | 8 | 8 |
| Current, start | amps | 1,760 | 1,560 |
| Current, finish | amps | 1,300 | 550 |
| Anolyte sp. gr. @60° F. | | 1.03 | 1.03 |
| Temperature of effluents | °F | 160–170 | 160–170 |
| Operating Time on Diaphragms: | | | |
| start | hr | 0 | 281 |
| finish | do | 281 | 776 |
| Length of Run | do | 281 | 495 |
| Total NH₃ Consumption | lb | 661 | 1,007 |
| Power Consumption, D.C. | kw.hr. | 3,280 | 4,789 |
| PROPERTIES | | | |
| Charge: | | | |
| DEA: | | | |
| Free | wt. percent | 6.96 | 7.40 |
| Combined | do | 10.76 | 10.96 |
| Total | do | 17.72 | 18.36 |
| Thiocyanate Ion | do | 4.07 | 3.92 |
| Ammonia | do | 0.25 | 0.27 |
| Specific Gravity | | 1.074 | 1.072 |
| Product: | | | |
| DEA: | | | |
| Free | wt. percent | 17.25 | 14.78 |
| Combined | do | 2.75 | 2.55 |
| Total | do | 20.00 | 17.33 |
| Thiocyanate Ion | do | 1.32 | 0.80 |
| Ammonia | do | 0.75 | 0.83 |
| Specific Gravity | | 1.051 | 1.040 |
| MATERIAL BALANCE | | | |
| Charge | lb | 14,402 | 15,090 |
| DEA: | | | |
| Free | do | 1,002 | 1,117 |
| Total | do | 2,552 | 2,771 |
| Samples Removed | do | 204 | 342 |
| DEA: | | | |
| Free | do | 25 | 38 |
| Total | do | 38 | 61 |
| Product | do | 12,847 | 16,729 |
| DEA: | | | |
| Free | do | 2,216 | 2,473 |
| Total | do | 2,569 | 2,899 |
| Net Gain or Loss of: | | | |
| Solution | do | −1,351 | +1,981 |
| DEA: | | | |
| Free | do | +1,239 | +1,394 |
| Total | do | +55 | +189 |
| Overall Regeneration Rate: | | | |
| lb. DEA/hr./ft.² | | 0.572 | 0.365 |
| Overall Ammonia Consumption: | | | |
| lb. NH₃/lb. DEA purified | | 0.535 | 0.722 |
| Overall Power Consumption, D.C.: | | | |
| kw.hr./lb. DEA purified | | 2.65 | 3.44 |

It will be noted that in both runs there was a gain or apparent gain in the total amount of free and combined diethanolamine in the solutions. This might be ascribed to experimental error; even with careful technique the analytic method (ion exchange followed by titration, the ammonia determination being deducted from the result) was found to give rather variable results. However, similar gains were observed consistently in numerous experiments and it is considered likely that a real increase in the amount of amine occurs. In the operation of an amine absorption process there are unexplained losses of amine and there is evidence that these losses are due to conversion of amine into related but nonelectrolytic compounds which have not been identified. It is possible that some of these substances are reconverted into active amine by reaction with nascent hydrogen at the cathodes of the electrolytic cells. The substantial increase in concentration of total diethanolamine noted in Run A has a different explanation; it resulted from evaporation of water from the solution.

At the end of Run A the diaphragms, having been in operation for 281 hours, showed insignificant signs of wear or weakening by chemical attack. At the end of Run B the diaphragms had been in service for a total of 776 hours and were still functioning.

In Run B the efficiency was less than in Run A and considerable dilution of the catholyte with water occurred. In part this was the result of the greater duration of Run B and the reduction of the thiocyanate content to a lower level, which markedly reduces electrolytic efficiency. The results of Run B at the end of a number of passes equivalent to the total of Run A were estimated by interpolation. It was found that, if the run had been terminated at that time, the overall regeneration rate would have been about 0.462 pound of free DEA per hour per square foot of diaphragm area, the ammonia consumption would have been 0.625 pound per pound of DEA purified, and the power consumption would have been 3.08 kw.hr. per pound of DEA purified. The remaining reduction in efficiency may have been the result of partial deterioration of one or more of the diaphragms.

In the operation of electrolytic cells of commercial size it is advisable to employ precautions against the development of localized zones of acidity in the anode compartments. This can be accomplished by creating mild turbulence in the anolyte, as by introducing the liquid at moderately high lineal velocity through a restricted orifice or by recirculating the anolyte liquid through the cells at a relatively high volume rate. It is for the same reason that it may be desirable to maintain the pH of the anolyte at a level somewhat higher than 7.5, such as 8.0.

The pH of the anolyte being controlled as disclosed herein, other variables such as electrode spacing, current density, and voltage can be permitted to vary over wide ranges. The one-inch electrode spacing is convenient but by no means critical. A constant operating E.M.F. of 8 volts yields good results. In experimental runs conducted at constant current density the E.M.F. went as high as 10 volts without harmful effects. Efficiency of the process increases to some degree as the temperature of the electrolytes increases, but is is preferable to avoid temperatures high enough to cause boiling. If the process is conducted at atmospheric pressure, temperatures greater than about 180° F. as measured in the outlet manifolds may be accompanied by boiling within the cells. If the electrolytes are introduced to a battery of commercial size at atmospheric temperature, the effluent liquids may be at a temperature such as 140° F., at which good results are obtained. If the electrolytes are initially warm, as is more usually the case, correspondingly higher cell temperatures will be reached and the efficiency may be a little greater.

I claim as my invention:

1. In a method of increasing the proportion of free amine in an aqueous amine solution contaminated with acidic anions which includes passing said contaminated solution through a cathode compartment of an electrolytic cell while an anolyte liquid is passed through an anode compartment of said cell, the improvement comprising: interposing between said cathode compartment and said anode compartment a permeable, water-resistant diaphragm of cellulosic material, and continuously adding a base to said anolyte liquid in amount sufficient to maintain the hydrogen-ion concentration of said anolyte liquid within said anode compartment between the limits pH 6.0 and pH 10.0.

2. In a method of increasing the proportion of free amine in an aqueous amine solution contaminated with acidic anions which includes passing said contaminated solution through a cathode compartment of an electrolytic cell while an anolyte liquid is passed through an anode compartment of said cell, the improvement comprising: interposing between said cathode compartment and said anode compartment a permeable, water-resistant diaphragm of cellulosic material, and continuously adding a base to said anolyte liquid in amount sufficient to maintain the hydrogen-ion concentration of the anolyte liquid emerging from said cell within the limits pH 7.5 and pH 8.0.

3. In a method of increasing the proportion of free amine in an aqueous amine solution contaminated with acidic anions which includes passing said contaminated solution through a cathode compartment of an electrolytic cell while an anolyte liquid is passed through an anode compartment of said cell, the improvement comprising: interposing between said cathode compartment and said anode compartment a permeable, water-resistant diaphragm of cellulosic material, and continuously adding ammonia to said anolyte liquid in amount sufficient to maintain the hydrogen-ion concentration of said anolyte liquid within said anode compartment between the limits pH 6.0 and pH 10.0.

4. In a method of increasing the proportion of free amine in an aqueous amine solution contaminated with acidic anions which includes passing said contaminated solution through a cathode compartment of an electrolytic cell while an anolyte liquid is passed through an anode compartment of said cell, the improvement comprising: interposing between said cathode compartment and said anode compartment a permeable, water-resistant diaphragm of cellulosic material, and continuously adding ammonia to said anolyte liquid in amount sufficient to maintain the hydrogen-ion concentration of the anolyte liquid emerging from said cell within the limits pH 7.5 and pH 8.0.

5. A method as described in claim 1, in which said cellulosic material consists at least in part of regenerated cellulose.

6. A method as described in claim 2, in which said cellulosic material consists at least in part of regenerated cellulose.

7. A method as described in claim 3, in which said cellulosic material consists at least in part of regenerated cellulose.

8. A method as described in claim 4, in which said cellulosic material consists at least in part of regenerated cellulose.

References Cited in the file of this patent

UNITED STATES PATENTS

| 2,694,680 | Katz et al. | Nov. 16, 1954 |
| 2,726,930 | Edwards et al. | Dec. 13, 1955 |
| 2,768,945 | Shapiro | Oct. 30, 1956 |
| 2,796,395 | Roberts | June 18, 1957 |
| 2,897,130 | Van Dorsser et al. | July 28, 1959 |